Nov. 4, 1941.  J. MURCIC  2,261,743
FRUIT AND VEGETABLE CUTTER
Filed Sept. 18, 1939
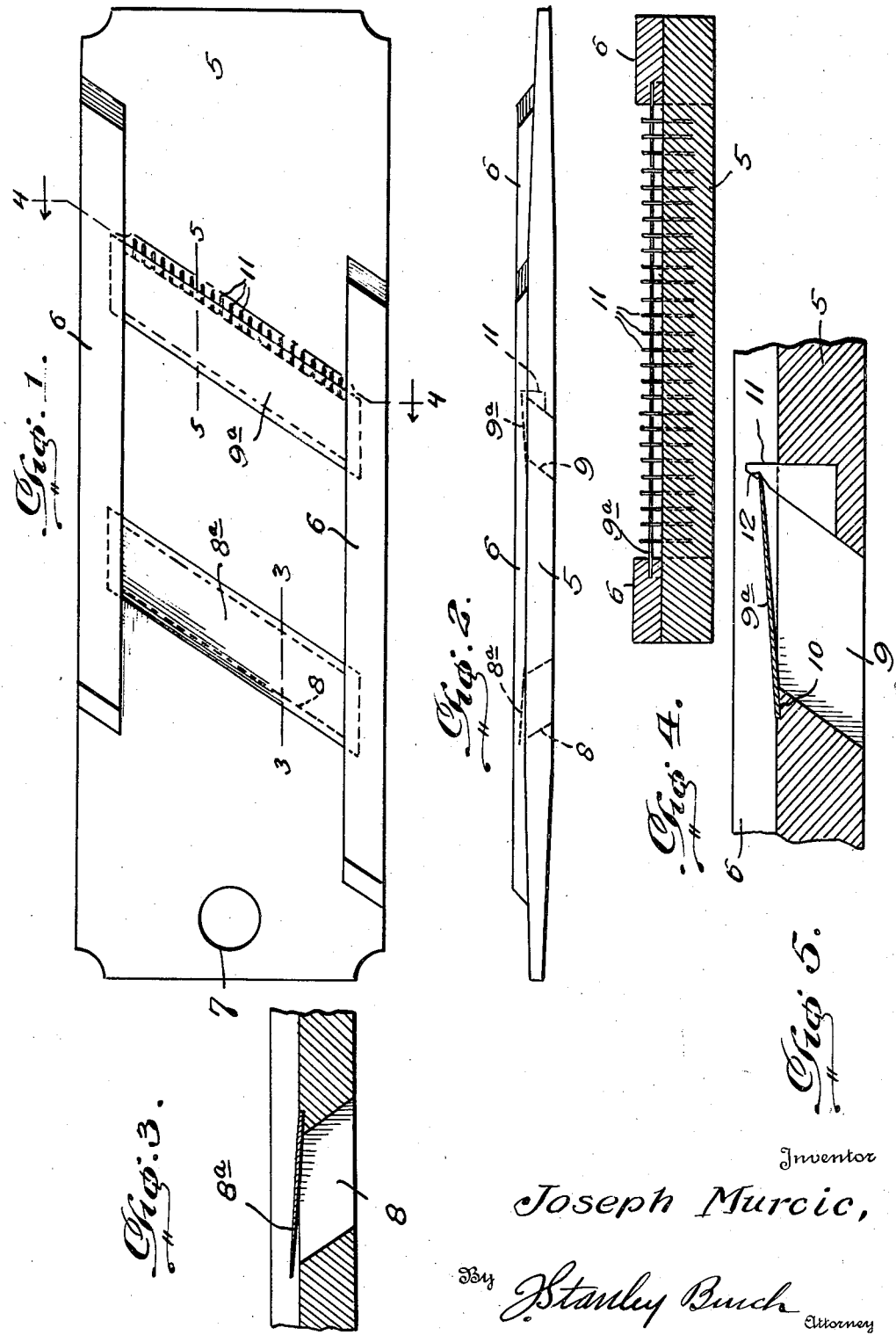
Inventor
Joseph Murcic,
By Stanley Burch
Attorney Patented Nov. 4, 1941

2,261,743

UNITED STATES PATENT OFFICE 2,261,743

FRUIT AND VEGETABLE CUTTER

Joseph Murcic, Bethlehem, Pa.

Application September 18, 1939, Serial No. 295,506

2 Claims. (Cl. 146—171)

This invention relates to fruit and vegetable cutters of that type wherein a slicing blade is mounted transversely of the base board of a trough along which the material to be cut is reciprocated by hand past the slicing blade to effect the desired cutting operation.

The primary object of the present invention is to provide an improved construction or formation and association of parts in a fruit and vegetable cutter of this type.

Another object of the present invention is to provide a fruit and vegetable cutter of the above type which is extremely simple and durable in construction, as well as efficient in use.

The present invention also contemplates the novel provision of shredding cutters in association with a slicing cutter.

With the above objects in view, the present invention consists in the novel form, combination and arrangement of parts hereinafter more fully described, shown in the accompanying drawing and claimed.

In the drawing:

Figure 1 is a top plan view of a fruit and vegetable cutter constructed in accordance with the present invention.

Figure 2 is a side elevational view thereof.

Figure 3 is an enlarged fragmentary longitudinal section on line 3—3 of Figure 1.

Figure 4 is an enlarged transverse section on line 4—4 of Figure 1; and

Figure 5 is a view similar to Figure 3 taken on line 5—5 of Figure 1.

Referring in detail to the drawing, the present device includes a trough composed of an oblong baseboard 5 and guide strips or cleats 6 secured on the upper face of the baseboard 5 along the side or longitudinal marginal edge portion of the latter. The baseboard 5 is tapered thinner toward the ends thereof as shown clearly in Figure 2 so as to facilitate ease of handling the device in use, and a finger opening 7 is provided in one end of the baseboard 5 to facilitate convenient holding of the implement in proper position during use.

The baseboard 5 is provided with two transverse slots 8 and 9 which are spaced apart longitudinally of the baseboard intermediate the ends of the latter and which extend obliquely of the baseboard as shown. The transverse walls of these slots are inclined but parallel with each other, and mounted over each of the slots 8 and 9 is a slicing blade 8a and 9a. The ends of the blades 8a and 9a are embedded in the guide strips 6 so that the blades are supported in an inclined position with the cutting edges thereof elevated slightly above the upper surface of the baseboard and with the rear unsharpened edges thereof countersunk in the upper surface of said baseboard as at 10. The transverse walls of slot 8 incline downwardly and away from the cutting edge of blade 8a while the transverse walls of slots 9 incline similarly with respect to the cutting edge of blade 9a. However, blades 8a and 9a face in opposite directions so that either blade 8a or 9a may be used independently of the other. Obviously, as the vegetable or fruit is cut by the blades 8a or 9a, the material cut therefrom is discharged downwardly through the associated slot 8 or 9. By driving the ends of the blades into the guide cleats 6, said blades are effectively mounted in position without the aid of screws or like fastenings and in a most efficient manner.

The blade 8a is employed when simple slicing is desired, but triangular shredding blades 11 are associated with the blade 9a so that blades 9a and 11 cooperate when shredding of the fruit or vegetable is desired. As shown, the shredding blades 11 are embedded in the baseboard 5 in transverse spaced relation to each other and parallel with the transverse wall of slot 9 adjacent the cutting edge of blade 9a. The forward vertical cutting edges of the shredding blades 11 are provided near the apices of said blades 11 where the latter are exposed or project above the upper surface of the baseboard 5, and the rear unsharpened edges of the shredding blades 11 are coextensive with the adjacent transverse wall of slot 9 as shown clearly in Figure 5. Thus, as the fruit or vegetable is moved toward the left of Figure 5, the same is sliced by the blades 9a directly after being divided vertically of each slice by the blades 11, the shreds passing under the blade 9a and downwardly through the slot 9. It will be seen that the slicing blades 11 are abutted by the cutting edge of blade 9a so as to prevent displacement of the blades 11 from the baseboard by reason of the pressure of the fruit or vegetable thereagainst in the shredding operation. If desired, the cutting edge portion of blade 9a may engage in notches 12 provided in the rear inclined edges of shredding blades 11 so that the latter will effectively brace the blade 9a against upward flexing, particularly intermediate the ends of said blade 9a. In this way, the shredding blades 11 are of simple form and effectively mounted in place without the aid of separate fasteners and without requiring the same to be carried by an attaching plate secured to the baseboard.

What I claim as new is:

1. In a fruit and vegetable cutter of the character described, a trough comprising an oblong base plate and guide strips secured on the upper face of the base plate along the longitudinal margin of the latter, a slicing cutter arranged obliquely of the base plate and having its ends embedded in the guide strips to position the blade with its cutting edge portion elevated slightly above the upper surface of the baseboard, said baseboard having an oblique slot therethrough beneath said slicing blade, the transverse walls of said slot being inclined downwardly away from the cutting edge of the slicing blade, and triangular shredding blades embedded in the baseboard with their apices projecting above the upper surface of the latter directly in front of the cutting edge of said slicing blade, said shredding blades having inclined rear unsharpened edges coextensive with a transverse wall of said slot.

2. In a fruit and vegetable cutter of the character described, a trough comprising an oblong base plate and guide strips secured on the upper face of the base plate along the longitudinal margin of the latter, a slicing cutter arranged obliquely of the base plate and having its ends embedded in the guide strips to position the blade with its cutting edge portion elevated slightly above the upper surface of the baseboard, said baseboard having an oblique slot therethrough beneath said slicing blade, the transverse walls of said slot being inclined downwardly away from the cutting edge of the slicing blade, triangular shredding blades embedded in the baseboard with their apices projecting above the upper surface of the latter directly in front of the cutting edge of said slicing blade, said shredding blades having inclined rear unsharpened edges coextensive with a transverse wall of said slot, said shredding blades having notches in said inclined rear edges thereof in which the cutting edge portion of the slicing blade is engaged so as to prevent upward flexing of said slicing blade or rearward displacement of the shredding blades.

JOSEPH MURCIC.